Figure 1:
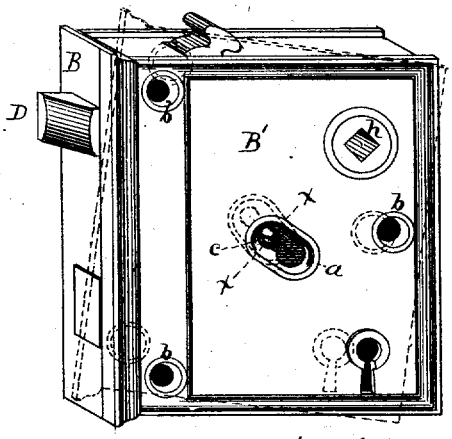

J. KINZER.

Case for Reversible Latches and Locks.

No. 6,282. Reissued Feb. 9, 1875.

Witnesses { Chas G. Page. Claudius L. Parker

Inventor Jacob Kinzer

THE GRAPHIC CO. PHOTO-LITH. 39 & 41 PARK PLACE, N.Y.

UNITED STATES PATENT OFFICE.

JACOB KINZER, OF PITTSBURG, PENNSYLVANIA.

IMPROVEMENT IN CASES FOR REVERSIBLE LATCHES AND LOCKS.

Specification forming part of Letters Patent No. 123,567, dated February 13, 1872; reissue No. 6,282, dated February 9, 1875; application filed January 14, 1875.

CASE H.

*To all whom it may concern:*

Be it known that I, JACOB KINZER, of the city of Pittsburg, county of Allegheny, State of Pennsylvania, have invented an Improvement in Cases for Reversible Latch-Bolts, of which the following is a specification:

In the drawing hereunto annexed, which is hereby made a part of this specification, and in which like letters of reference indicate like parts—

Figure 3:
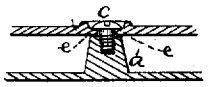
Figure 2:
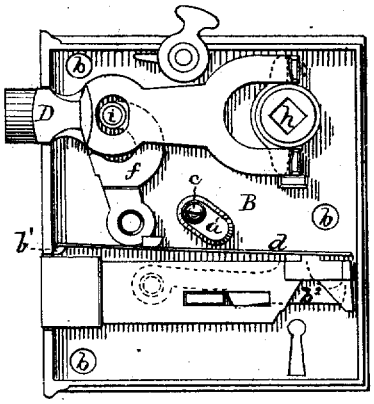

Figure 1 is a perspective view of my improved lock-case with the case-plate attached, and illustrating by dotted lines the manner of sliding the case-plate, so as to be removed for the purpose of reversing the latch-bolt. Fig. 2 shows the inside of the case, with the face-plate removed and the latch-bolt reversed; and Fig. 3 shows a detached sectional view of the sliding T-joint employed in this improvement, as formed by a plane through *x x*, Fig. 1.

My invention consists chiefly in the combination of a sliding T-joint with the removable case-plate of a lock-case, having a reversible latch-bolt, whereby the face-plate may be readily removed and replaced in connection with the reversal of the bolt, and when replaced properly held in position; and it further consists in the combinations of the several devices employed in such construction, substantially as hereinafter set forth and claimed.

At B I have shown that part of the lock-case which contains the bolts and their operating devices, and which, for convenience, I term the fixed part of the case. It, as well as the bolts and the means of operating them, may be of any ordinary construction, the latch-bolt D, however, being what is commonly known as reversible. The removable case-plate B′ is made separate from the rest of the case, and has an oblong opening or slot, *a*, for receiving the head of a rivet or screw, *c*, as shown in the drawing. The hub *h* projects through or engages the case-plate B′, and I make the slot *a* so that it shall extend lengthwise nearly in the direction of a line which would be produced at that point in swinging the plate B′ from the hub *h* as a center. On the inner surface of the case B, and corresponding in position to the slot or opening *a*, I make a projection, *a*′, extending nearly, or quite, to the inner surface of the removable plate B′ when the latter is in position. In this projection I insert a headed rivet or screw, *c*, by means of which the plate B′ is held to the case.

While a rivet may be used instead of a screw, or the projection *a*′ be made with a cast-iron head, I consider the screw as the better device, especially for purposes of adjustment, according to the thickness of the case-plate. The opening or slot in which the head *c* works is made with edges beveled or sloping on their outer face, and the seat formed thereby for the head *c* is made at a bevel below that of the outer face of the plate B′, and thereby gives a more finished appearance to the lock-case when completed, and avoids unnecessary projections.

In attaching the plate B′ it is brought into position substantially as indicated by dotted lines in Fig. 1, such that the other parts shall come properly into their seats, and the head *c* shall enter the slot or opening *a*, which at one end is properly shaped for that purpose. The projecting edges of the head *c* then come above or even with the outer face of the lips *e e*, which form the opposite sides of the slot or opening *a*, and such lips *e e* being at their inner edges at a distance apart as great as or greater than the diameter of the shank or stem of the head *c*, but less than the distance across the head *c* from outer edge to outer edge. The plate B′ is slid along to the position it is intended to occupy, as shown by full lines, in which position the projecting flanges or sides of the head *c* will bear on the lips *e e* with a degree of pressure regulated by the adjustment of such head, or the slope of the engaging surfaces, and so hold the plate B′ in place. Now, to reverse the latch-bolt D, the plate B′ is removed by reversing the operation of attaching it, after which the bolt is reversed, and the plate B′ reattached in the manner described.

The projecting edges or flanges of the head *c* in connecting with the lips *e e*, which they engage, constitute in effect a sliding T-joint, and the interposition of such a joint between the opposite plates of a lock-case, whereby one may be attached to or removed from the other by a sliding motion, and when attached held thereby in proper position for use, I believe to be new with me; nor do I wish to confine myself to the particular form of the slot or opening shown in the drawing. Any form of slot, hole, or opening in the case-plate which will pass the head of the rivet or screw is within the principle of my invention, even though washers or other devices should be used to catch the rivet or screw and hold the plate.

When the lock is applied to the door, it will be fastened by screws or nails through the holes *b b b*, so that the latch-bolt having once been properly set, the fastenings which hold the lock will prevent the case-plate from being moved while the lock is in actual use.

In order that the latch-bolt can be easily taken out and turned over without displacing or disarranging any other parts of the lock, I make these locks with a single straight metallic spring, *d*, Fig. 2, one end of which rests on the projecting lug $b^1$, and the other on the top of the guard $b^2$. The lever *f* is made with its lower arm resting and acting on the spring *d*. The upper arm has a pin, *i*, at the end, which projects through the hole in the latch-bolt D. By means of this lever the spring *d* is made to act both on the lock-bolt guard $b^2$ and on the latch-bolt D, while the latch itself, being free from all springs and other machinery of the lock, can be taken out and reversed at pleasure whenever the case-plate is removed.

What I claim as my invention, and desire to secure by Letters Patent, is—

1. A sliding T-joint, in combination with a lock-case, having a removable face-plate and a reversible latch-bolt, whereby the face-plate may be attached and detached, and also held in place without the necessary use of other fastening, substantially as set forth.

2. A head, *c*, vertically adjustable, in combination with the removable face-plate of a lock-case and the engaging edges or lips *e e*, between which the shank or stem of the head *c* slides in attaching and detaching, substantially as set forth.

3. A slot or opening, *a*, widened at one end, in combination with the headed rivet or screw *c* and hub *h*, when arranged so that the case-plate turns on the hub as a bearing while it is being fastened or removed, substantially as set forth.

In testimony whereof I have hereunto set my hand.

JACOB KINZER.

Witnesses:
CLAUDIUS S. PARKER,
CHAS. G. PAGE.